(12) United States Patent
Guyomard et al.

(10) Patent No.: US 8,998,306 B2
(45) Date of Patent: Apr. 7, 2015

(54) FRONT-END MODULE FOR A MOTOR VEHICLE

(75) Inventors: Jean-Nicolas Guyomard, Le Mesnil Fuguet (FR); Leonardo Camargo, Stella Maris Salvador (BR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 14/234,774

(22) PCT Filed: Jul. 24, 2012

(86) PCT No.: PCT/EP2012/064498
§ 371 (c)(1),
(2), (4) Date: Apr. 10, 2014

(87) PCT Pub. No.: WO2013/014154
PCT Pub. Date: Jan. 31, 2013

(65) Prior Publication Data
US 2014/0232137 A1 Aug. 21, 2014

(30) Foreign Application Priority Data

Jul. 26, 2011 (FR) ..................... 11 56828

(51) Int. Cl.
*B60N 99/00* (2006.01)
*B60Q 1/04* (2006.01)
*B62D 21/15* (2006.01)
*B62D 25/08* (2006.01)

(52) U.S. Cl.
CPC ............ *B60Q 1/0483* (2013.01); *B62D 21/152* (2013.01); *B62D 25/084* (2013.01)

(58) Field of Classification Search
USPC ......................................... 296/187.09, 193.09
See application file for complete search history.

(56) References Cited

U.S. PATENT DOCUMENTS

| 6,945,593 B2* | 9/2005 | Andre et al. ............. 296/187.09 |
| 7,029,154 B2* | 4/2006 | Arlon et al. .................... 362/507 |
| 2010/0080013 A1 | 4/2010 | Riviere et al. |

FOREIGN PATENT DOCUMENTS

| EP | 1 398 199 A2 | 3/2004 |
| EP | 1 481 878 A1 | 12/2004 |
| FR | 2 825 964 A1 | 12/2002 |
| FR | 2 888 197 A1 | 1/2007 |
| WO | WO 03/051704 A1 | 6/2003 |

OTHER PUBLICATIONS

International Search Report for Application No. PCT/EP2012/064498 dated Aug. 27, 2012, 7 pages.

(Continued)

*Primary Examiner* — Lori L Lyjak
(74) *Attorney, Agent, or Firm* — Howard & Howard Attorneys PLLC

(57) ABSTRACT

A front-end module (1) for a motor vehicle; includes a supporting part (3, 7, 8), wherein the supporting part (3, 7, 8) includes two headlight brackets (5), each of which is attached onto a separate side of the supporting part (3, 7, 8), the headlight bracket (5) including a mechanism (53) for attaching the supporting part (3, 7, 8) to an attachment area (4), thus forming an attachment axis (A) about which the headlight bracket (5) can pivot relative to the mounting part (3, 7, 8) in the event of an impact.

15 Claims, 3 Drawing Sheets

(56) References Cited

OTHER PUBLICATIONS

Figure 1:
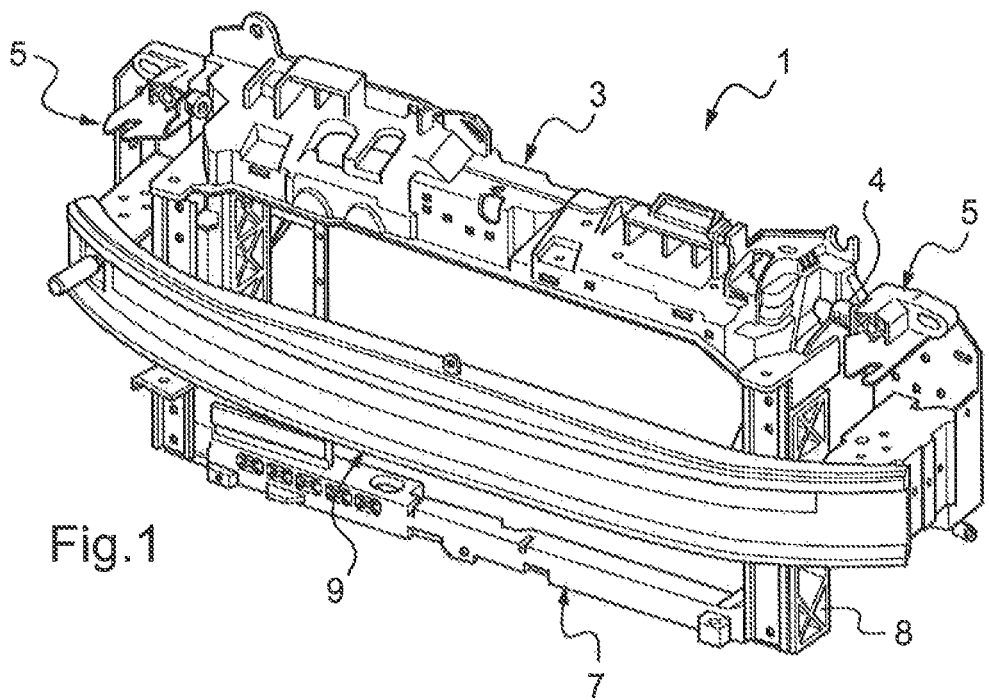

English language abstract and machine-assisted English translation for FR 2 825 964 extracted from espacenet.com database on May 29, 2014, 35 pages.

Machine-Assisted English language abstract and Machine-Assisted English language translation for FR 2 888 197 extracted from espacenet.com database on May 21, 2014, 18 pages.

English language abstract and machine-assisted English translation for WO 03/051704 extracted from espacenet.com database on May 29, 2014, 33 pages.

* cited by examiner

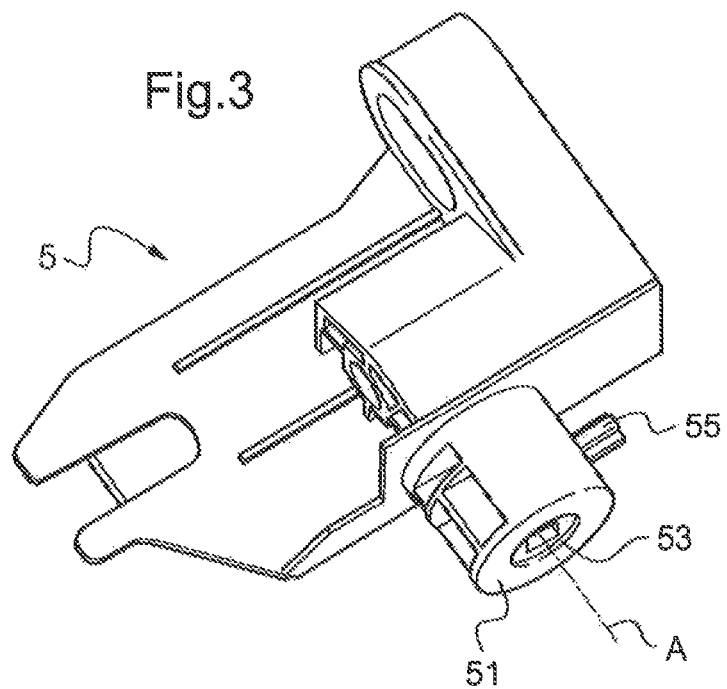
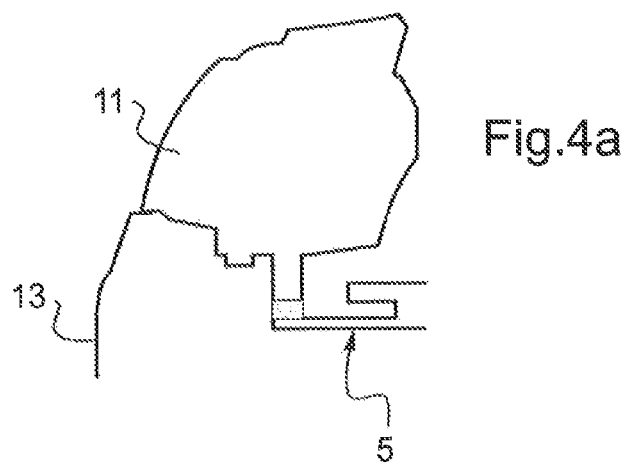
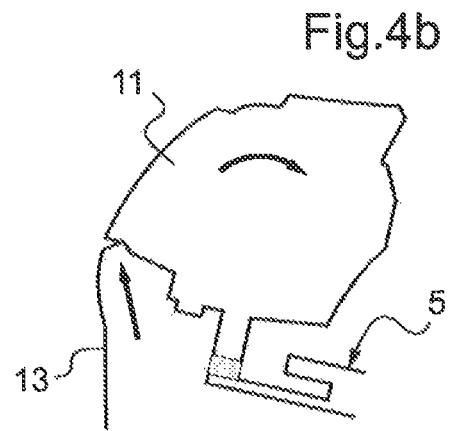

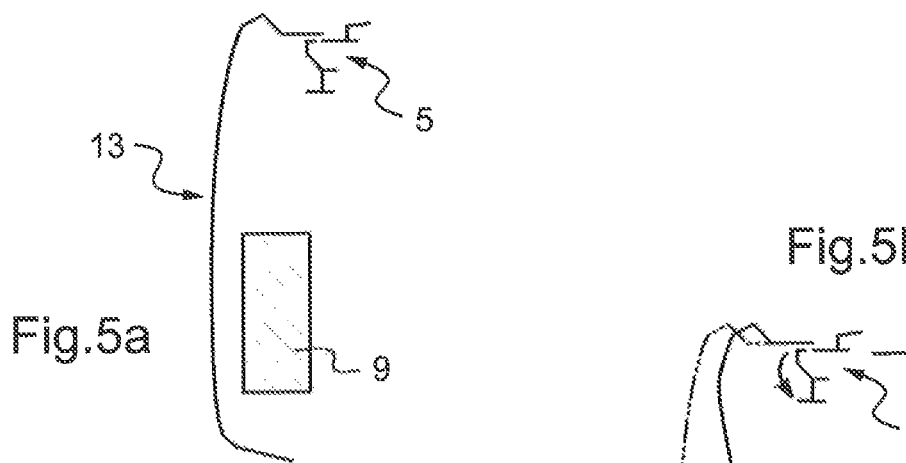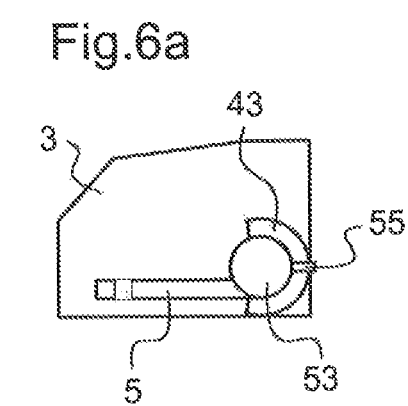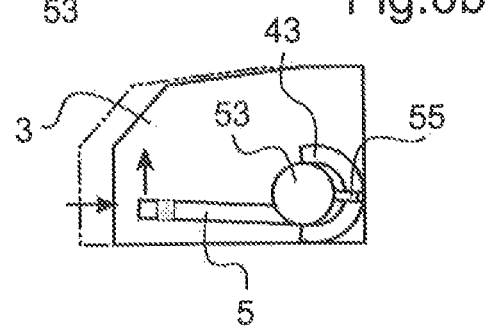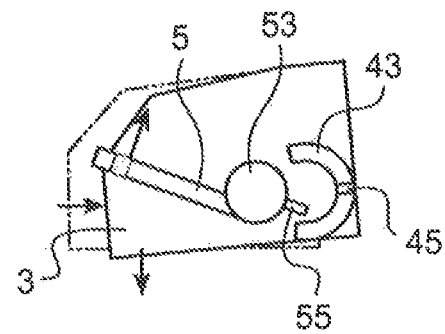

FRONT-END MODULE FOR A MOTOR VEHICLE

RELATED APPLICATIONS

This application is a National Stage of International Patent Application No. PCT/EP2012/064498, filed on Jul. 24, 2012, which claims priority to and all the advantages of French Patent Application No. FR/56828, filed on Jul. 26, 2011, the content of which is incorporated herein by reference.

The present invention relates to the field of the front-end modules for motor vehicles, and more specifically the front-end modules for motor vehicles made up of a plurality of distinct parts.

A front end is a structural component likely to incorporate various equipment items of the motor vehicle such as the headlights, blinkers, horn, heat exchanger, cooling module, etc.

The front end, thus provided with its equipment items, constitutes a unitary module that can be prepared and delivered by an equipment manufacturer and ready to be mounted on a motor vehicle during installation by the constructor. The front end is mounted by connection to the components of the chassis of the vehicle, such as the stringers, then a front bumper or fender is put in place, added to the module.

A front end generally comprises a support part for one or more radiators or cooling modules, for the front headlights, and a bumper beam which helps to protect the module equipment items in the event of a front impact. These components are fastened together rigidly in order to maintain the geometry and the cohesion of the assembly. In order to better meet the technical manufacturing and economical constraints, it is known practice to segment the support part into different parts fastened together rigidly. It is thus known practice to have support parts comprising a bottom crossmember with side uprights, a top crossmember fastened between or at the top of the side uprights and headlight supports fastened to the ends of the top crossmember and/or onto the side uprights.

In an impact, its different parts can be subjected to torsion and shear stresses that can cause its parts to break and/or fastenings to break. The breaking of the support part can thus force the motor vehicle to be immobilized because of the possible damage to the supported components, notably linked to the cooling module, and this de facto increases the repair costs.

One of the aims of the invention is therefore to at least partially remedy the drawbacks of the prior art and to propose a front-end module for a motor vehicle likely to limit the breaking of the support part in the event of an impact.

The present invention therefore relates to a front-end module for a motor vehicle comprising a support part, said support part comprising two headlight supports each fastened onto a distinct side of the support part, said headlight support including a means for fastening to a fastening area of the support part forming a fastening axis around which said headlight support can pivot relative to the support part in the event of an impact.

According to one aspect of the invention, each of the fastening areas includes a fastening plate at right angles to the longitudinal axis of the support part, said fastening plate including an oblong notch whose opening is directed toward the front of the vehicle and that each headlight support is fastened to said fastening plate.

According to another aspect of the invention, each headlight support includes a revolution component situated on the fastening axis and that each of the fastening areas includes a recess complementing said revolution component and open toward the front of the vehicle, in which said revolution component is housed and which closely follows the form of said revolution component.

According to another aspect of the invention, the revolution component is a cylindrical component whose axis of symmetry is merged with the fastening axis.

According to another aspect of the invention, the revolution component is a truncated cylindrical component including at least one planar facet, said at least one planar facet being situated on the portion of the truncated cylindrical component that fits into the complementary recess.

According to another aspect of the invention, the revolution component includes a positioning pin at right angles to the fastening axis and that the complementary recess includes a positioning orifice, said pin being inserted into said positioning orifice.

According to another aspect of the invention, the positioning pin is part of the same material as the revolution component.

According to another aspect of the invention, the positioning pin is an independent part fastened to the revolution component.

According to another aspect of the invention, the fastening areas are situated at the ends of a top crossmember of the support part.

According to another aspect of the invention, the fastening areas are situated on the side uprights of the support part.

Figure 2:
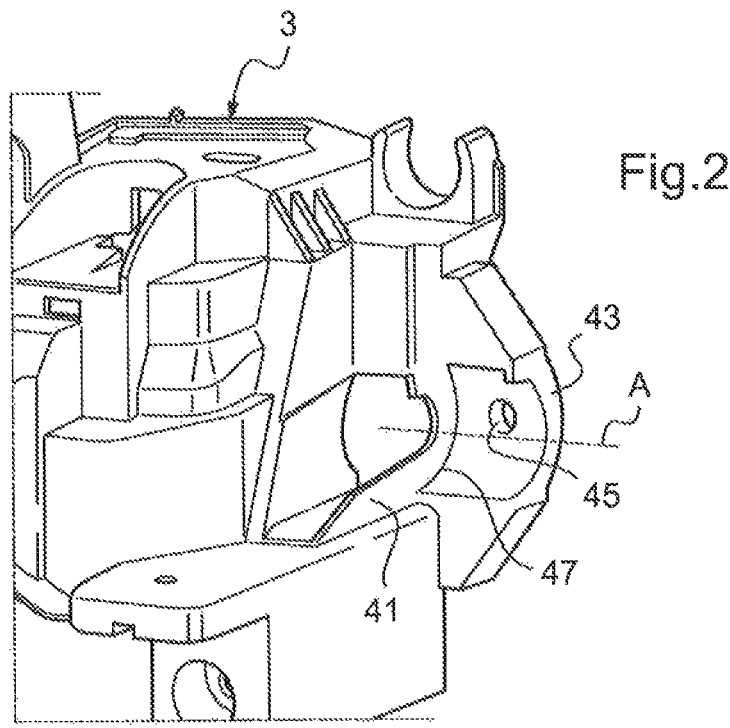

Other features and advantages of the invention will become more clearly apparent on reading the following description, given by way of an illustrative and nonlimiting example, and from the appended drawings in which:

FIG. 1 shows a schematic representation of a front-end module,

FIG. 2 shows a schematic representation of the fastening area for a headlight support on the support part, FIG. 3 shows a schematic representation of a headlight support, FIGS. 4a and 4b show a schematic representation of the movements and forces applied to a headlight in the event of a front impact, FIGS. 5a and 5b show a schematic representation of the movements and forces applied to a front-end module in the event of a front impact, FIGS. 6a to 6c show a schematic representation of the movements and forces applied to the link between the support part and the headlight support in the event of a front impact.

The identical components in the different figures bear identical references.

FIG. 1 shows a schematic representation of a front-end module 1. Said front-end module 1 comprises a support part 3, 7, 8 to which can be fastened components such as cooling modules (not represented). Said support part 3, 7, 8 comprises a bottom crossmember 7, side uprights 8 and a top crossmember 3. These different components can be of a single piece or else be independent parts fastened together. Thus, the top crossmember 3 can be independent and be fastened to the top of the side uprights 8. The side uprights 8 and the bottom crossmember 7 can also form one and the same part, said part thus having a general "U" shape.

The front-end module 1 also comprises, on each of its sides, headlight supports 5. Said headlight supports 5 are fastened to the support part 3, 7, 8 on a dedicated fastening area 4 as well as to the chassis of the vehicle. Said fastening area 4 also being able to be well situated on the top crossmember 3 (as shown in FIG. 1) or the side uprights 8.

The front-end module 1 can also comprise a bumper beam 9 which helps to protect the components of the module in the event of a front impact.

FIG. 2 shows a schematic representation of the fastening area for a headlight support 5 on the support part 3, 7, 8. Said fastening area 4 comprises a fastening plate 41 at right angles to the longitudinal axis of the support part 3, 7, 8, to which the headlight support 5 is fastened. For this, the plate 41 includes an oblong notch 47 whose opening is directed toward the front of the vehicle and into which passes a fastening component allowing for fastening the headlight support 5 onto a fastening axis A, for example a screw. The fastening area 4 also includes a recess 43 that is open toward the front of the vehicle.

FIG. 3 shows a schematic representation of a headlight support 5. Said headlight support 5 notably includes a fastening means 53 for fastening the headlight support 5 to the plate 41 of the fastening area 4. The fastening means 53 can, for example, be a tapped orifice 53, as represented by FIG. 3, able to receive a screw or even a threaded rod able to receive a bolt, this makes it possible to fasten the headlight support 5 in the oblong notch 47 of the plate 41.

The fastening of the headlight support 5 onto the fastening area 4 by virtue of the fastening means 53 thus defines a fastening axis A around which said headlight support 5 can undergo a revolution. The fastening means 53 can also be a metallic insert or other fastening system known to a person skilled in the art, defining a fastening axis A between the fastening area 4 and the headlight support 5.

The headlight support 5 also includes a revolution component 51 situated on the fastening axis A. When the headlight support 51 is fastened to the fastening area 4, the revolution component is inserted into the complementary recess 43, said recess 43 closely following the form of said revolution component 51. This revolution component 51, being situated on the fastening axis A, makes it possible to absorb the pivoting stresses of the headlight support 5 around said fastening axis A.

As shown by FIGS. 2 and 3, the revolution component 51 can have a cylindrical form and the recess 43 can consequently be semi-cylindrical in order to be able to accommodate it.

The revolution component 51 can include a positioning component 55, at right angles to the fastening axis A. This positioning component 55 allows for the correct positioning of the fastening support 5 on the fastening area 4 and consequently the positioning of the fastening support 5 relative to the support part 3, 7, 8.

As shown by FIGS. 2 and 3, the positioning component 55 can be a pin 55 which, when the revolution component 51 is in the recess 43, is inserted into an orifice 45 situated inside said recess 43. The pin 55 can be part of the same material as the revolution component 51 or else said pin 55 can be an independent part, fastened to the revolution component 51 and can thus be replaced in the event of a breakage.

Another embodiment (not represented) of the positioning component 55 can be that the revolution component 51 has a truncated cylindrical form with at least one planar facet, the planar facet or facets being situated on the portion of the revolution component 51 that fits into the complementary recess 43 closely following the truncated cylindrical form of the revolution component 51. For example, the revolution component 51 can have an octagonal form and the recess 43 takes on the negative image of this form.

The headlight support 5 also includes at least one fastening means for the headlight (not represented) as well as at least one means for fastening to the chassis of the vehicle (not represented). Said support can, furthermore, also be fastened to the support part 3, 7, 8 as well as to a wing of the motor vehicle.

FIGS. 4a and 4b show a side view of the movements and motions undergone by a headlight 11 fastened onto its headlight support 5 and by a front face bar 13 of a motor vehicle. FIG. 4a shows all of these components in position, before a front impact, and FIG. 4b shows them after the front impact.

The impact causes a rearward deformation of the face bar 13, that is to say toward the engine compartment, this deformation of the face bar imparting an upward pivoting force and motion, that is to say toward the hood of the vehicle, of the headlight 11 and of the headlight support 5 to which it is fastened.

For their part, FIGS. 5a and 5b show a schematic side view representation of the movements and forces undergone by a front face bar 13 of a motor vehicle, a bumper beam 9 and a support part 3, 7, 8, more particularly here by the top crossmember 3, in the event of a front impact. FIG. 5a shows all of these components in position before a front impact, and FIG. 5b shows them after the front impact.

The impact here causes a rearward deformation of the face bar 13, a rearward motion of the bumper beam 9 as well as a rearward motion and downward pivoting of the top crossmember 3.

The pivoting motions of the headlight support 5 and of the support part 3, 7, 8 are therefore opposed and the front-end module 1 according to the invention makes it possible to take up these opposing motions.

FIGS. 6a to 6c show a schematic side view representation of the movements and forces applied to the link between the support part 3, 7, 8, more particularly the top crossmember 3, and the headlight support 5 allowing for the absorption of these opposing motions in the event of a front impact.

FIG. 6a shows these different parts positioned relative to one another in running condition. The headlight support 5 is fastened to the plate 41 at the notch 47 by virtue of the fastening means 53. The revolution component 51 is inserted into the recess 43.

In the example shown by these figures, the positioning component 55 of the headlight support 5 is a pin 55 inserted into the orifice 45 of the recess 43.

At the start of the front impact (FIG. 6b), the top crossmember 3 is subjected to a recoiling rearward motion, that is to say toward the engine compartment, and the headlight support 5 remains in its position because it is fastened to the chassis of the vehicle. By virtue of the notch 47 and the fastening means 43, the top crossmember 3 can recoil toward the engine compartment whereas the headlight support 5 remains immobile in translation because of its fastening to the chassis of the vehicle.

These two parts thus have opposing motions and because they can move independently of one another while remaining fastened to one another, there is no breaking of the fastening and/or of one of the two parts.

Because of the rearward motion of the top crossmember 1, the revolution component 51 disengages from the recess 43. The headlight support 5 also undergoes an upward pivoting motion, that is to say toward the hood of the vehicle, which is absorbed because the headlight support 5 can rotate about the fastening axis A.

In the case where the positioning component 55 is a pin, it can undergo significant stresses, notably in the event of a high speed impact, and give way because of the pivoting of the headlight support while it is still partly inserted into its orifice 45.

Later in the progress of the front impact (FIG. 6c), the amplitude of the rearward motions of the top crossmember 3 and the amplitude of the upward revolution of the headlight support 5 are greater. The top crossmember 3 also undergoes a downward pivoting motion about the fastening axis A and contrary to the upward pivoting motion about the fastening axis A of the headlight support 5.

It can therefore be clearly seen that the possibility of the support part 3, 7, 8 and the headlight supports 5 have of being able to have opposing motions because of an impact makes it possible to safeguard against the possible breaking of one or more of these parts and therefore allow for reduction in the repair costs as well as possibly the immobilization of the vehicle because of the impact and the damage to the equipment items supported by the support part 3, 7, 8.

The invention claimed is:

1. A front-end module (1) for a motor vehicle, the front end module (1) comprising a support part (3, 7, 8), the support part (3, 7, 8) comprising two headlight supports (5) each fastened onto a distinct side of the support part (3, 7, 8) wherein the headlight support (5) includes a means (53) for fastening to a fastening area (4) of the support part (3, 7, 8) forming a fastening axis (A) horizontally transverse to a longitudinal axis of the vehicle around which the headlight support (5) can pivot fore and aft in the longitudinal direction relative to the support part (3, 7, 8) in the event of an impact.

2. A front-end module (1) for a motor vehicle the front-end module (1) comprising a support part (3, 7, 8), the support part (3, 7, 8) comprising two headlight supports (5) each fastened onto a distinct side of the support part (3, 7, 8) wherein the headlight support (5) includes a means (53) for fastening to a fastening area (4) of the support part (3, 7, 8) forming a fastening axis (A) around which the headlight support (5) can pivot relative to the support part (3, 7, 8) in the event of an impact; and
wherein each of the fastening areas (4) includes a fastening plate (41) at right angles to a longitudinal axis of the support part (3, 7, 8), the fastening plate (41) including an oblong notch (47) whose opening is directed toward a front of the motor vehicle, and that each headlight support (5) is fastened to the fastening plate (41).

3. A front-end module (1) for a motor vehicle the front-end module (1) comprising a support part (3, 7, 8), the support part (3, 7, 8) comprising two headlight supports (5) each fastened onto a distinct side of the support part (3, 7, 8) wherein the headlight support (5) includes a means (53) for fastening to a fastening area (4) of the support part (3, 7, 8) forming a fastening axis (A) around which the headlight support (5) can pivot relative to the support part (3, 7, 8) in the event of an impact; and
wherein each headlight support (5) includes a revolution component (51) situated on the fastening axis (A) and that each of the fastening areas (4) includes a recess (43) complementing the revolution component (51) and open toward a front of the vehicle, in which the revolution component (51) is housed and which closely follows a form of the revolution component (51).

4. The front-end module (1) for a motor vehicle as claimed in claim 3, wherein the revolution component (51) is a cylindrical component whose axis of symmetry is merged with the fastening axis (A).

5. The front-end module (1) for a motor vehicle as claimed in claim 3, wherein the revolution component (51) is a truncated cylindrical component including at least one planar facet, the at least one planar facet being situated on a portion of the truncated cylindrical component that fits into the complementary recess (43).

6. The front-end module (1) for a motor vehicle as claimed in claim 3, wherein the revolution component (51) includes a positioning pin (55) at right angles to the fastening axis (A) and that the complementary recess (43) includes a positioning orifice (45), the pin (55) being inserted into the positioning orifice (45).

7. The front-end module (1) for a motor vehicle as claimed in claim 6, wherein the positioning pin (55) is part of the same material as the revolution component (51).

8. The front-end module (1) for a motor vehicle as claimed in claim 6, wherein the positioning pin (55) is an independent part fastened to the revolution component (51).

9. The front-end module (1) for a motor vehicle as claimed in claim 1, wherein the fastening areas (4) are situated at ends of a top crossmember (3) of the support part (3, 7, 8).

10. The front-end module (1) for a motor vehicle as claimed in claim 1, wherein the fastening areas (4) are situated on side uprights (8) of the support part (3; 7; 8).

11. The front-end module (1) for a motor vehicle as claimed in claim 2, wherein each headlight support (5) includes a revolution component (51) situated on the fastening axis (A) and that each of the fastening areas (4) includes a recess (43) complementing the revolution component (51) and open toward a front of the vehicle, in which the revolution component (51) is housed and which closely follows a form of the revolution component (51).

12. The front-end module (1) for a motor vehicle as claimed in claim 4, wherein the revolution component (51) includes a positioning pin (55) at right angles to the fastening axis (A) and that the complementary recess (43) includes a positioning orifice (45), the pin (55) being inserted into the positioning orifice (45).

13. The front-end module (1) for a motor vehicle as claimed in claim 5, wherein the revolution component (51) includes a positioning pin (55) at right angles to the fastening axis (A) and that the complementary recess (43) includes a positioning orifice (45), the pin (55) being inserted into the positioning orifice (45).

14. The front-end module (1) for a motor vehicle as claimed in claim 3, wherein the fastening areas (4) are situated at ends of a top crossmember (3) of the support part (3, 7, 8).

15. The front-end module (1) for a motor vehicle as claimed in claim 6, wherein the fastening areas (4) are situated at ends of a top crossmember (3) of the support part (3, 7, 8).

* * * * *